(12) United States Patent
Hwang

(10) Patent No.: US 9,173,184 B2
(45) Date of Patent: Oct. 27, 2015

(54) MOBILE COMMUNICATION SYSTEM SUPPORTING SERVICE CENTRALIZATION AND CONTINUITY AND METHOD THEREOF

(75) Inventor: Jin-Ho Hwang, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 93 days.

(21) Appl. No.: 13/336,079

(22) Filed: Dec. 23, 2011

(65) Prior Publication Data
US 2013/0165116 A1    Jun. 27, 2013

(51) Int. Cl.
H04W 60/00 (2009.01)

(52) U.S. Cl.
CPC .................................. H04W 60/00 (2013.01)

(58) Field of Classification Search
CPC ........... H04W 8/02; H04W 8/04; H04W 8/06; H04W 60/00–60/06
USPC ................ 455/404.2, 418–422.1, 432.1–444, 455/456.1, 458; 370/310.2, 328, 338
See application file for complete search history.

(56) References Cited

U.S. PATENT DOCUMENTS

| | | | | |
|---|---|---|---|---|
| 7,190,969 | B1* | 3/2007 | Oh et al. | 455/551 |
| 2009/0129318 | A1* | 5/2009 | Xu et al. | 370/328 |
| 2010/0009681 | A1* | 1/2010 | Schneyer et al. | 455/435.1 |
| 2011/0149852 | A1* | 6/2011 | Olsson et al. | 370/328 |
| 2011/0256866 | A1* | 10/2011 | Noldus et al. | 455/433 |
| 2012/0077489 | A1* | 3/2012 | Kosar | 455/432.3 |
| 2012/0307732 | A1* | 12/2012 | Olsson et al. | 370/328 |

* cited by examiner

Primary Examiner — San Htun
(74) Attorney, Agent, or Firm — IP Legal Services, LLC

(57) ABSTRACT

Mobile communication system supporting service centralization and continuity and method thereof. A mobile communication system may include a home subscriber server and a service centralization and continuity application server. The mobile subscriber server may be configured to register a location of a user equipment and to transmit location registration information of the user equipment. The service centralization and continuity application server may be configured to receive the location registration information of the user equipment from the home subscriber server.

11 Claims, 2 Drawing Sheets

MOBILE COMMUNICATION SYSTEM SUPPORTING SERVICE CENTRALIZATION AND CONTINUITY AND METHOD THEREOF

FIELD OF THE INVENTION

Apparatuses and methods consistent with the present invention relate to a mobile communication system, and more particularly, to service centralization and continuity in a third generation (3G) mobile communication system.

BACKGROUND OF THE INVENTION

In a third generation (3G) mobile communication system, a service centralization and continuity (SCC) application server may provide various services including IP multimedia subsystem (IMS) centralized services and IMS service continuity. Particularly, the SCC application server may provide a domain selection function and a domain transfer function to a user equipment connected to a typical circuit switched (CS) domain through a mobile access network, such as a universal terrestrial radio access network (UTRAN), a GSM/EDGE radio access network (GERAN), or an IMS network.

The domain selection function may enable a user equipment to select a domain in order to be connected with a call through an IMS domain. The domain transfer function may enable a user equipment to transfer a connected call from a CS domain to a packet switched (PS) or vice versa according to given conditions. Such functions of the SCC application server may extend a wireless service coverage area. In particular, the functions of the SCC application server may transfer a certain call to a wireless network such as an IM core network subsystem. Accordingly, the SCC application server may reduce the load of mobile communication networks.

In order to provide such services of the SCC application server, the SCC application server needs to have information on all networks that a subscriber is registered to. However, related SCC technical standards do not define location registration in existing networks such as a wideband code division multiple access (WCDMA) network. For example, a user equipment in a WCDMA network does not register its location at an SCC application server, so backward compatibility to the WCDMA network is not supported. Accordingly, a fixed mobile convergence (FMC) seamless service cannot be provided to a user equipment using a WCDMA network.

SUMMARY OF THE INVENTION

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, location registration may be performed to implement service centralization and continuity (SCC) in an existing network such as a wideband code division multiple access (WCDMA) network.

In accordance with another aspect of the present invention, an SCC application server may obtain information on all networks that a user equipment is registered with by transmitting information on location registration of the user equipment to the SCC application server.

In accordance with still another aspect of the present invention, a fixed mobile convergence (FMC) based seamless service may be provided to a user equipment by obtaining information on all networks that the user equipment is registered with through an IMS based SCC application server.

In accordance with a further another aspect of the present invention, an SCC application server may support backward compatibility with a WCDMA network by transferring location registration information to the SCC application server.

In accordance with an embodiment of the present invention, a mobile communication system may include a home subscriber server and a service centralization and continuity (SCC) application server. The home subscriber server may be configured to register a location of a user equipment and to transmit location registration information of the user equipment. The SCC application server may be configured to receive the location registration information of the user equipment from the home subscriber server.

The mobile communication system may further include a switching center. The switching center may be configured to receive a location registration request message from the user equipment when the user equipment attempts to register a location through a circuit switching domain, and configured to transmit the location registration request message to the home subscriber server.

The user equipment may support an IP multimedia subsystem (IMS) function and may be coupled to a wideband code division multiple access (WCDMA) network.

The mobile communication system may further include a call session control function. The call session control function may be configured to receive a first register message from the user equipment when the user equipment attempts to register a location through a packet switched domain.

The home subscriber server may transmit a second register message to the SSC application server upon receipt of a location registration request message from a mobile switching center in order to transmit the location registration information.

The second register message may include a session initiation protocol (SIP) message.

In accordance with another embodiment of the present invention, a method is provided for registering a location of a user equipment at an SCC application server, the method including: performing location registration of the user equipment in a circuit switched domain, and providing location registration information of the user equipment to the SCC application server.

The location registration information may include information of a network to which the user equipment registers and may be transmitted by a home subscriber server to the SCC application server using a session initiation protocol message.

In accordance with a still another embodiment of the present invention, a method is provided for registering a location of a user equipment at an SCC application server, the method including: registering a location of the user equipment to at least one of a circuit switched domain and a packet switched domain, and transmitting location registration information of the user equipment to the SCC application server.

The location registration information may be transmitted by a home subscriber server to the SCC application server when the location of the user equipment is registered to the circuit switch domain. A first register message may be transmitted by the home subscriber server to the SCC application server upon receipt of a location registration request message from a mobile switching center, in order to transmit the location registration information.

The location registration information may be transmitted by a call session control function to the SCC application server when the location of the user equipment is registered to the packet switch domain. A second register message may be transmitted by the call session control function to the SCC application server, in order to transmit the location registration information.

When a location is registered by the user equipment at the circuit switched domain, a register request message may be transmitted by the user equipment to a mobile switching center.

When a location is registered by the user equipment at the packet switched domain, a register request message may be transmitted by the user equipment to a call session control function.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
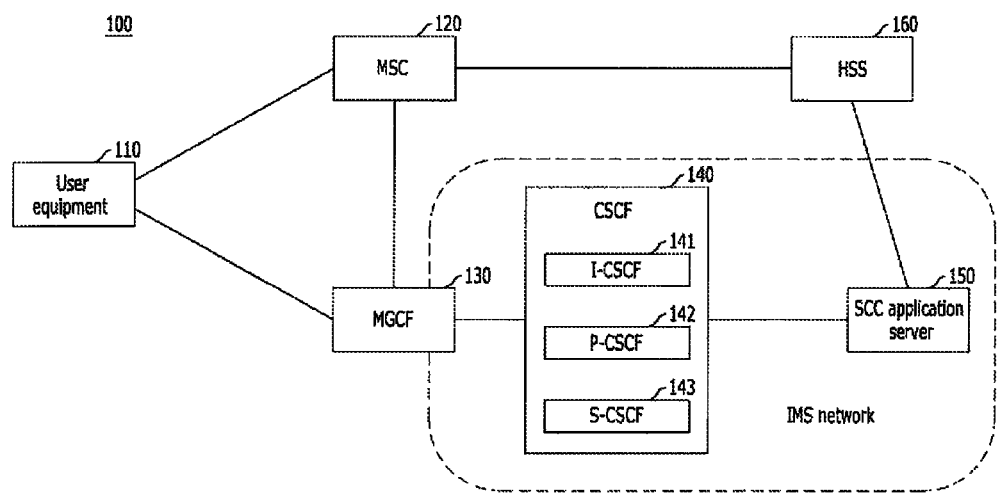
FIG. 1 illustrates a third generation (3G) mobile communication system supporting a service centralization and continuity (SCC) application server.

Reference will now be made in detail to embodiments of the present invention, examples of which are illustrated in the accompanying drawings, wherein like reference numerals refer to like elements throughout. The embodiments are described below, in order to explain the present invention by referring to the figures.

In an embodiment of the present invention, a user equipment in an existing network such as a wideband code division multiple access (WCDMA) network may register its location at a service centralization and continuity (SCC) application server. Accordingly, the SCC application server may be aware of a location of the user equipment and a network to which the user equipment registers even if the user equipment in the WCDMA network performs location registration through a circuit switched (CS) domain. Hereinafter, a third generation (3G) mobile communication system in accordance with an embodiment of the present invention will be described with reference to FIG. 1.

FIG. 1 illustrates a 3G mobile communication system supporting SCC, in accordance with an embodiment of the present invention.

Referring to FIG. 1, the 3G mobile communication system 100 supporting SCC may include a user equipment 110, a mobile switching center (MSC) 120, a media gateway control function (MGCF) 130, a call session control function (CSCF) 140, an SCC application server 150, and a home subscriber server (HSS) 160.

The user equipment 110 in a circuit switched (CS) domain may be coupled to the MSC 120. The user equipment 110 may be a user device for receiving various types of services, such as a mobile communication service and a data service. The user equipment 110 may be a user device capable of using services in a CS domain according to a mobile communication system. For example, the user equipment 110 may include any or all of a personal computer (PC), a personal digital assistant (PDA), a hand-held PC, a global system for mobile (GSM) phone, a WCDMA phone, and a mobile broadband system (MBS) phone, but the present invention is not limited thereto. The user equipment 110 may be any device supporting 3G telecommunication systems and/or an IMS function.

The user equipment 110 may transmit a location registration request to the SCC application server 150 of an IMS domain. For example, the user equipment 110 may transmit a location registration request to the MSC 120 through the CS domain and receive a location registration response from the MSC 120 through the CS domain in response to the location registration request. The location registration response may include SCC routing information. When the user equipment 110 receives the location registration response from the MSC 120, the user equipment 110 can transmit a location registration request to the SSC application server 150 of the IMS domain based on the SCC routing information.

When the user equipment 110 attempts to register to a CS domain, the user equipment 110 may transmit a request message to the MSC 120. On the contrary, when the user equipment 110 attempts to register to a packet switched (PS) domain, the user equipment 110 may transmit a register message to the CSCF 140. Specifically, the user equipment 110 may transmit a session initiation protocol (SIP) register message to a P-SCSF 142.

The MSC 120 may have a control function for controlling and managing wireless base stations in order for efficient operation of the wireless base station. The MSC 120 may also have a linkage function for linking a public switched telephone network (PSTN) and switching centers of other networks. The MSC 120 may acquire a subscriber profile from the HSS 160 according to the location registration request of the user equipment 110. Based on the acquired subscriber profile, the MSC 120 may perform location registration at the CS domain when the user equipment 110 is an SCC service subscriber. The MSC 120 may acquire SCC routing information from the HSS 160 as the location registration response. The MSC 120 may send the acquired SCC routing information to the user equipment 110. The location registration process of the MSC 120 in the CS domain in response to the location registration request of the user equipment 110 may be known to those skilled in the art. Accordingly, further detail descriptions thereof will be omitted. In addition, when the MSC 120 receives an outgoing call from the user equipment 110, the MSC 120 may search for location information of a called user equipment. For example, the MSC 120 may find a global title (GT) through interpretation of a call prefix number and obtain the location information of the user equipment 110 through inquiring the HSS 160 related to the found GT. The MSC 120 may route the call from the user equipment 110 to a switching center where the called user equipment is based on the location information.

The MSC 120 may receive the request message from the user equipment 110 when the user equipment 110 attempts to register its location at a CS domain. Upon receipt of the request message, the MSC 120 may transmit a location registration request message to the HSS 160. The MSC 120 may receive a location registration response message from the HSS 160 in response to the location registration request message. The MSC 120 may transmit the response message to the user equipment 110 when the MSC 120 receives the location registration response message from the HSS 160.

The MGCF 130 may perform protocol conversion between an integrated services digital network user part (ISUP) and an IMS call control protocol. The MGCF 130 may connect the ISUP with the MSC 120 belonging to the CS domain. The MGCF 130 may select the CSCF 140 in order for routing a call entering to an IMS domain. The MGCF 130 needs to support signaling interworking and media control between the CS domain and the IMS domain in accordance with related SCC standards defined by a mobile communication system.

The CSCF 140 may perform functions related to a call processing in an IMS network. The CSCF 140 may perform location registration of a user equipment at an IMS PS domain and transmit location registration information of the user equipment to the SCC application server 150. Such a CSCF 140 may include any or all of a call control function (CCF), a serving profile database (SPD), and an address handling (AH).

The CCF may be responsible for call setup, call termination, status/event management, and call event report for billing. The CCF may receive and process application level registration. The SPD may notify of a home domain to a user equipment at the initial access of the user equipment. Such a function of the SPD may be similar to a visitor location registration (VLR) of a typical network. The SPD may also manage user profile information by communicating with an HSS in the home domain. The AH may analyze, translate and modify addresses, and support address portability.

The CSCF 140 may perform different functions according to a type of network in which a subscriber is located. The CSCF 140 is logically divided into an interrogating-CSCF (I-CSCF) 141, a proxy-CSCF (P-CSCF) 142, and a serving-CSCF (S-CSCF) 143 based on the locations and functions thereof.

The P-CSCF 142 may be a session initiation protocol (SIP) proxy server that is the first contact point for the user equipment 110 in the IMS network. The P-CSCF 142 may be located in a home network or a visited network. The user equipment 110 may need to acquire location information of the P-CSCF 142 to be connected. For example, the user equipment 110 may acquire such location information of the P-CSCF 142 through a dynamic host configuration protocol (DHCP) or a PDP context activation procedure. The P-CSCF 142 may be allocated to the user equipment 110 when the user equipment 110 is registered at the IMS network. After allocation, the P-CSCF 142 is not changed while the user equipment 110 is registered at the IMS network. In addition, the P-CSCF 142 may perform a policy control function, a bandwidth management function, and a quality of service (QoS) control function. The P-CSCF 142 may be located in a path of all signaling messages and may inspect the signaling messages. The P-CSCF 142 may authenticate users and establish an IPsec security associated with the user equipment 110. Such functions of the P-CSCF 142 may prevent a spoofing attack and a replay attack. Furthermore, the P-CSCF 142 may protect the private data of users. The P-CSCF 142 may compress and decompress SIP messages using signaling compression (SigComp). Such functions of the P-SCSF 142 may reduce round-trips over radio links. The P-CSCF 142 may also generate charging data records (CDR).

The I-CSCF 141 may be located at an edge of an administrative domain when a border function does not exist. Therefore, an IP address of the I-CSCF 141 may be published in a domain name system (DNS) of a related domain. Based on the published IP address of the I-CSCF 141, a server in other domains may find the I-CSCF 141 and use it as an input node of a network. The I-CSCF 141 may query the HSS 160 and retrieve the location of the user equipment 110 by using a Cx interface and/or a Dx interface. Based on the location of the user equipment 110, the I-CSCF 141 may send a SIP message to the S-CSCF 143 to which the user equipment 110 is allocated with. When delivering the SIP message between different domains, the I-CSCF 141 may not deliver a certain part of the network information to another domain by performing a topology hiding inter-network gateway (THIG) of a firewall function.

The S-CSCF 143 is a central node of a signaling layer. The S-CSCF 143 may serve as a SIP server and perform a session control function. The S-CSCF 143 may be always located in the home network. The S-CSCF 143 may use Cx/Dx interfaces to download user profiles from the HSS 160 or upload user profiles to the HSS 160. The S-CSCF 143 may bind the location of the user equipment 110 and the SIP address, upon SIP registration. The S-CSCF 143 may be located in the path of all signaling messages and inspect all the signaling messages. The S-CSCF 143 may decide to which application server(s) the SIP message will be routed, in order to provide services.

The HSS 160 may be a user information database. The HSS 160 may support IMS entities that perform a session control. The HSS 160 may store user-related subscription information associated with a multimedia session control, for example, user location information, security information for user authentication and authorization, and/or user profile information including a service that a user has subscribed to.

The HSS 160 may receive the location registration request message from the MSC 120 when the user equipment 110 attempts to register its location at a CS domain. After the location registration of the user equipment 110, the HSS 160 may transmit a register message to the SCC application server 150. The register message may include the location registration information. The location registration information may be information on a location of the user equipment 110 in the CS domain and a network that the user equipment 110 is registered to.

The SCC application server 150 may provide a domain selection function and a domain transfer function. The SCC application server 150 may perform anchoring of a call transmitted from a CS domain and anchoring of a call transmitted from the IMS domain. Information on the transmitted call, such as a call ID and/or a public user identity, may be stored by such an anchoring process. Accordingly, all calls transmitted from the user equipment 110 having subscribed for SCC services may be transferred to the SCC application server 150.

The SCC application server 150 may receive the register message from the HSS 160 when the user equipment 110 is registered at a CS domain. The register message may include location registration information. After receiving the register message, the SCC application server 150 may transmit a response message to the HSS 160.

Furthermore, the SCC application server 150 may receive a register message from the S-CSCF 143 when the user equipment 110 is registered at the IMS PS domain. Also, the register message may include location registration information of the user equipment 110. Accordingly, the SCC application server 150 may be informed of the location registration information of the user equipment 110 when the user equipment 110 is registered at not only the PS domain but also at the CS domain.

As described above in accordance with an embodiment of the present invention, the user equipment 110 in a WCDMA network can register its location to the SCC application server 150 through the CS domain. Accordingly, the SCC application server 150 can be aware of all the locations of the user equipment 110 and a network the user equipment 110 registers to even when the user equipment 110 uses the WCDMA network to access a core network. Based on the location registration information of the user equipment 110, the SCC application server 150 may select one of available domains including a CS domain and a PS domain to provide a related service to the user equipment 110. Furthermore, the SCC application server 150 may provide a seamless service even to a user equipment supporting only the WCDMA network.

Figure 2:
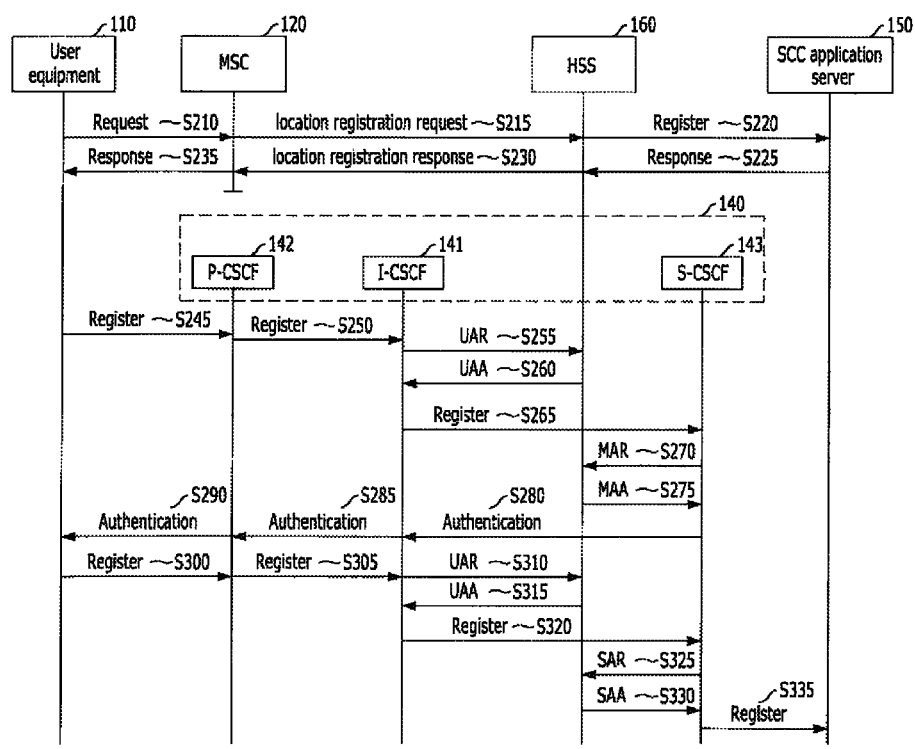
FIG. 2 illustrates a method for registering a location of a user equipment at an SCC application server, in accordance with an embodiment of the present invention.

FIG. 2 illustrates a method for registering a location of a user equipment at an SCC application server, in accordance with an embodiment of the present invention.

Referring to FIG. 2, a method for registering a location of a user equipment at an SCC application through a circuit switched (CS) domain will be first described. The user equipment 110 of FIG. 2 may be a device that supports 3G telecommunication systems and/or an IP multimedia subsystem (IMS) function, but the present invention is not limited thereto.

When the user equipment 110 attempts to perform location registration to a CS domain, a request message may be transmitted to the MSC 120 S210. For example, when the user equipment 110 attempts to register a location thereof in the CS domain, the user equipment 110 may transmit a request message to the MSC 120.

In response to the request message, a location registration request message may be transmitted to the HSS 160 S215. For example, upon receipt of the request message, the MSC 120 may transmit a location registration request message to the HSS 160 in response to the request message from the user equipment 110. The location registration request message may be a location update request such as a GSM MAP message.

With respect to the location registration request message, a register message may be transmitted to a corresponding SCC application server 150 S220. For example, the HSS 160 may transmit the register message to the SCC application server 150 in order to notify the SCC application server 150 that the user equipment 110 registers its location through the CS domain S220. Based on the register message, the SCC application server 150 may be aware of the location of the user equipment 110 and a network that the user equipment 110 is registered to.

In response to the register message, a response message may be transmitted to the HSS 160 S225. For example, the SCC application server 150 may transmit the response message in response to the register message and the HSS 160 receive the response message from the SCC application server 150. The HSS 160 may use a certain protocol, for example, a session initiation protocol (SIP), to exchange messages with the SCC application server 150. The present invention, however, is not limited thereto.

Accordingly, the register message and the response message, which are exchanged between the HSS 160 and the SCC application server 150 with respect to the location registration of the user equipment 110 through the CS domain, may be SIP messages. The present invention, however, is not limited thereto. Such messages may be messages created and exchanged based upon other communication protocols.

Upon receipt by the HSS 160 of the response message sent from the SCC application server 150, a location registration response message may be transmitted to the MSC 120 S230. For example, the HSS 160 may transmit the location registration response message to the MSC 120 with respect to the location registration request message when the HSS 160 receives the response message from the SCC application server 150. The location registration response message may be a location update response message.

Upon receipt by the MSC 120 of the location registration response message, a response message may be transmitted to the user equipment 110 S235. For example, the MSC 120 may transmit the response message to the user equipment 110 with respect to the location registration attempt when the MSC 120 receives the location registration response message from the HSS 160.

As described above, the SCC application server 150 may receive the location registration information of the user equipment from the HSS 160 after the location registration is performed. Accordingly, the SCC application server 150 may be aware of a location of the user equipment 110 and a network that the user equipment 110 is registered to although the user equipment 110 is coupled to a WCDMA network.

Hereinafter, a method for registering a location of a user equipment at an SCC application through an IMS based packet switched (PS) domain will be described. A user equipment supporting an IMS function may also perform the following procedure for notifying an SCC application server 150 of its location in an IMS PS domain. Accordingly, the SCC application server 150 may be aware of the location of the user equipment in the IMS PS domain and networks that the user equipment is registered to. If the user equipment 110 does not support the IMS function, the user equipment 110 may not perform the following procedures.

When the user equipment 110 attempts to perform location registration to the IMS PS domain, a register message may be transmitted to a CSCF 140 S245. For example, when the user equipment 110 attempts to register its location to the IMS PS domain, the user equipment 110 may transmit the register message to the CSCF 140 in order to register its location in the IMS PS domain at the SCC application server 150. The CSCF 140 may manage call processing in the IMS domain for the location registration in the IMS PS domain. Particularly, the user equipment 110 may transmit a SIP register message to a P-CSCF 142 of the CSCF 140 for requesting location registration S245. The SIP register message may include identity information of the user equipment 110.

The SIP register message may be transmitted to a corresponding I-CSCF 141 S250. For example, the P-CSCF 142 may receive the SIP register message, determine a domain of the user equipment 110 based on the received SIP register message, and pass the SIP register message to a corresponding I-CSCF 141 based on the determined domain of the user equipment 110.

Upon receipt by the I-CSCF 141 of the SIP register message, a user authorization request (UAR) message may be transmitted to the HSS 160 S255. For example, the I-CSCF 141 may receive the SIP register message from the P-CSCF 142 and transmit the UAR message to the HSS 160 in order to allocate a corresponding S-CSCF 143 to the user equipment 110 based on the HSS 160.

Upon receipt of the UAR message by the HSS 160, a user authorization answer (UAA) message may be transmitted to the I-CSCF 141 S260. For example, the HSS 160 may receive the UAR message and transmit the UAA message to the I-CSCF 141 in response to the UAR message. The I-CSCF 141 may receive the UAA from the HSS 160. The UAA message may include information on the corresponding S-CSCF 143 allocated to the user equipment 110.

The SIP register message may be transmitted to a corresponding S-CSCF 143 based on the UAA message S265. For example, the I-CSCF 141 may pass the SIP register message to the corresponding S-CSCF 143 allocated to the user equipment 110 based on the UAA message for requesting location registration.

Upon receipt of the SIP register message by the S-CSCF 143, a multimedia authentication request (MAR) message may be transmitted to the HSS 160 S270. For example, the S-CSCF 143 may transmit the MAR message to the HSS 160 in order to request information necessary for authentication of the user equipment 110 when the S-CSCF 143 receives the SIP register message from the I-CSCF 141.

Upon receipt of the MAR message by the HSS 160, a multimedia authentication answer (MAA) message may be transmitted to the S-CSCF 143 S275. For example, the HSS 160 may receive the MAR message from the S-CSCF 143 and transmit the MAA message to the S-CSCF 143. The S-CSCF 143 may receive the MAA message from the HSS 160 in response to the MAR message. The MAA message may include the requested authentication information such as an authentication vector.

Based on the authentication information included in the MAA message, authentication information may be transmitted by the S-CSCF 143 to the user equipment 110. For example, the S-CSCF 143 may transmit authentication information S280, which is included in the MAA message, to the user equipment 110 through the I-CSCF 141 S285 and the P-CSCF 142 S290. The authentication information may be information necessary for authenticating the user equipment 110. For example, the authentication information may be a message "unauthorized 401."

After performing an authentication procedure based on the received authentication information, a SIP register message with an authentication result may be transmitted again to the S-CSCF 143 through the P-CSCF 142 and the I-CSCF 141 (S300, S305, S310, S315, and S320). For example, based on the received authentication information, the user equipment 110 may perform an authentication procedure according to a given algorithm. The user equipment 110 may transmit the SIP register message including an authentication result value to the S-CSCF 143 again. Since the procedure of transmitting the SIP register message from the user equipment 110 to the S-CSCF 143 has already been described in detail above, further descriptions of steps S300 to S320 thereof will be omitted.

Upon receipt by the S-CSCF 143 of the register message with the authentication result value, a server assignment request (SAR) message may be transmitted to the HSS 160 S325. For example, the S-CSCF 143 may receive the SIP register message with the authentication result value. The S-CSCF 143 may perform a procedure of authenticating the user equipment 110 with the received authentication result value. When the user equipment 110 is successfully authenticated, the S-CSCF 143 may transmit the SAR message to the HSS 160 S325.

In response to the SAR message, a server assignment answer (SAA) message may be transmitted to the S-CSCF 143 S330. For example, the HSS 160 may receive the SAR message from the S-CSCF 143 and transmit the SAA message to the S-CSCF 143 in response to the SAR message. The SAA message may include information on a corresponding SCC application server 150.

Based on the SAA message, the SIP register message may be transmitted to a corresponding SCC application server 150 S335. For example, the S-CSCF 143 may relay the SIP register message to the corresponding SCC application server 150 based on the SAA message.

Accordingly, the SCC application server 150 may be aware of locations and networks that the user equipment 110 is registered to even though the user equipment 110 registers its location at the IMS PS domain.

As described above, the SCC application server 150 may receive information on the location registration of the user equipment 110 through the MSC 120 when the user equipment 110 performs the location registration at the CS domain. Furthermore, the SCC application server 150 may receive information on the location registration of the user equipment 110 through the CSCF 140 when the user equipment 110 performs the location registration at the IMS PS domain. Since the SCC application server 150 has information on networks that user equipment 110 registers with and locations of the user equipment 110 in the CS domain and the IMS PS domain, the SCC application server 150 may select a network to be used for providing SCC services by determining all networks that the user equipment 110 is registered with.

In accordance with embodiments of the present invention, the SCC function may be implemented in 3G mobile communication systems. An SCC application server may obtain information on all networks that a user equipment is registered with. Therefore, a fixed mobile convergence (FMC) based seamless service may be provided to users.

Methods in accordance with embodiments of the present invention may be recorded in computer-readable media, including program instructions to implement various operations embodied by a computer. The media also may include, alone or in combination with the program instructions, data files, data structures, and the like.

The media and/or program instructions may be those specially designed and/or constructed for the purposes of realizing embodiments of the present invention, or may be of the kind well-known and available to those having ordinary skill in the computer software arts. Examples of computer-readable media may include magnetic media such as hard disks, floppy disks, and magnetic tape; optical media such as CD-ROM and DVD; magneto-optical media such as optical disks; and/or hardware devices that may be specially configured to store and/or perform program instructions, such as ROM, RAM, flash memory, and the like. The media also may be a transmission medium such as optical or metallic lines, wave guides, and the like, including a carrier wave transmitting signals specifying the program instructions, data structures, and the like. Examples of program instructions may include both machine code, such as that produced by a compiler, and files containing higher level code that may be executed by the computer using an interpreter.

The above-described embodiments of the present invention may be realized by apparatuses and methods, and may also be realized by a program executing operations corresponding to the structure of the embodiments or by a recording medium storing the program.

The term "coupled" has been used throughout to mean that elements may be either directly connected together or may be coupled through one or more intervening elements.

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile communication system comprising:
a mobile switching center (MSC) configured to transfer, to a home subscriber server (HSS), a location registration request message which is received from a user equipment attempting a location registration through a circuit switched (CS) domain;

the home subscriber server (HSS) configured (i) to receive the location registration request message from the mobile switching center (MSC), (ii) to register a location of the user equipment according to the received location registration request message, and (iii) to transmit first location registration information of the user equipment using a session initiation protocol (SIP) message to a service centralization and continuity (SCC) application server without receiving a request for the first location registration information from the SCC application server; and the SCC application server configured (i) to receive the first location registration information of the user equipment from the home subscriber server (HSS), (ii) to receive second location registration information of the user equipment from a call session control function (CSCF) when a corresponding location registration is performed at a packet switched (PS) domain, and (iii) to perform anchoring of a call transferred from the circuit switched (CS) domain or the packet switched (PS) domain, wherein the SCC application server is an IP multimedia subsystem (IMS) based server; and wherein each of the first location registration information and the second location registration information includes information on locations of the user equipment and networks to which the user equipment registers.

2. The mobile communication system of claim 1, wherein:
the user equipment supports an IP multimedia subsystem (IMS) function; and
the user equipment is coupled to a wideband code division multiple access (WCDMA) network.

3. The mobile communication system of claim 1, wherein:
the call session control function (CSCF) is configured to receive a second register message from the user equipment when the user equipment attempts to register a location through the packet switched (PS) domain.

4. The mobile communication system of claim 1, wherein the home subscriber server (HSS) is configured to transmit a first register message to the SCC application server upon receipt of the location registration request message from the mobile switching center (MSC) in order to transmit the first location registration information.

5. A method of registering a location of a user equipment in a mobile communication system, the method comprising:
transferring, by a mobile switching center (MSC), a location registration request message which is received from the user equipment attempting a location registration through a circuit switched (CS) domain, to a home subscriber server (HSS);
receiving, by the home subscriber server (HSS), the location registration request message from the mobile switching center (MSC);
performing, by the home subscriber server (HSS), the location registration of the user equipment in the circuit switched (CS) domain according to the received location registration request message; and
providing, by the home subscriber server (HSS), first location registration information of the user equipment using a session initiation protocol (SIP) message to a service centralization and continuity (SCC) application server without receiving a request for the first location registration information from the SCC application server,
wherein the SCC application server is an IP multimedia subsystem (IMS) based server;

wherein the SCC application server is configured (i) to receive the first location registration information of the user equipment from the home subscriber server (HSS), (ii) to receive second location registration information of the user equipment from a call session control function (CSCF) when a corresponding location registration is performed at a packet switched (PS) domain, and (iii) to perform anchoring of a call transferred from the circuit switched (CS) domain or the packet switched (PS) domain; and wherein each of the first location registration information and the second location registration information includes information on locations of the user equipment and networks to which the user equipment registers.

6. The method of claim 5, wherein:
the user equipment supports an IP multimedia subsystem (IMS) function; and
the user equipment is coupled to a wideband code division multiple access (WCDMA) network.

7. A method of registering a location of a user equipment in a mobile communication system, the method comprising:
registering a location of the user equipment to at least one of a circuit switched (CS) domain and a packet switched (PS) domain; and
transmitting location registration information of the user equipment to a service centralization and continuity (SCC) application server without receiving a request for the location registration information,
wherein the SCC application server is an IP multimedia subsystem (IMS) based server;
wherein the registering includes:
transferring, by a mobile switching center (MSC), a location registration request message which is received from the user equipment attempting a location registration through the circuit switched (CS) domain, to a home subscriber server (HSS);
receiving, by the home subscriber server (HSS), the location registration request message from the mobile switching center (MSC);
registering, by the home subscriber server (HSS), the location of the user equipment according to the received location registration request message; and
receiving the location information of the user equipment through a call session control function (CSCF) when the location registration is performed at the packet switched (PS) domain,
wherein the transmitting includes:
transmitting, by the home subscriber server (HSS), the location registration information using a session initiation protocol (SIP) message to the SCC application server without receiving a request for the location registration information from the SCC application server when the location registration is performed at the circuit switched (CS) domain; and
transmitting, by the call session control function (CSCF), the location registration information to the SCC application server when the location registration is performed at the packet switched (PS) domain, and
wherein the location registration information includes information on locations of the user equipment and networks to which the user equipment registers.

8. The method of claim 7, wherein a location of the user equipment is registered as being in a wideband code division multiple access (WCDMA) network.

9. The method of claim 7, wherein a register message is transmitted by the call session control function (CSCF) to the SCC application server, in order to transmit the location registration information.

10. The method of claim 9, wherein the register message comprises a session initiation protocol (SIP) message.

11. The method of claim 7, wherein when a location is registered by the user equipment at the packet switched (PS) domain, a register request message is transmitted by the user equipment to the call session control function (CSCF).

* * * * *